Patented Apr. 1, 1930

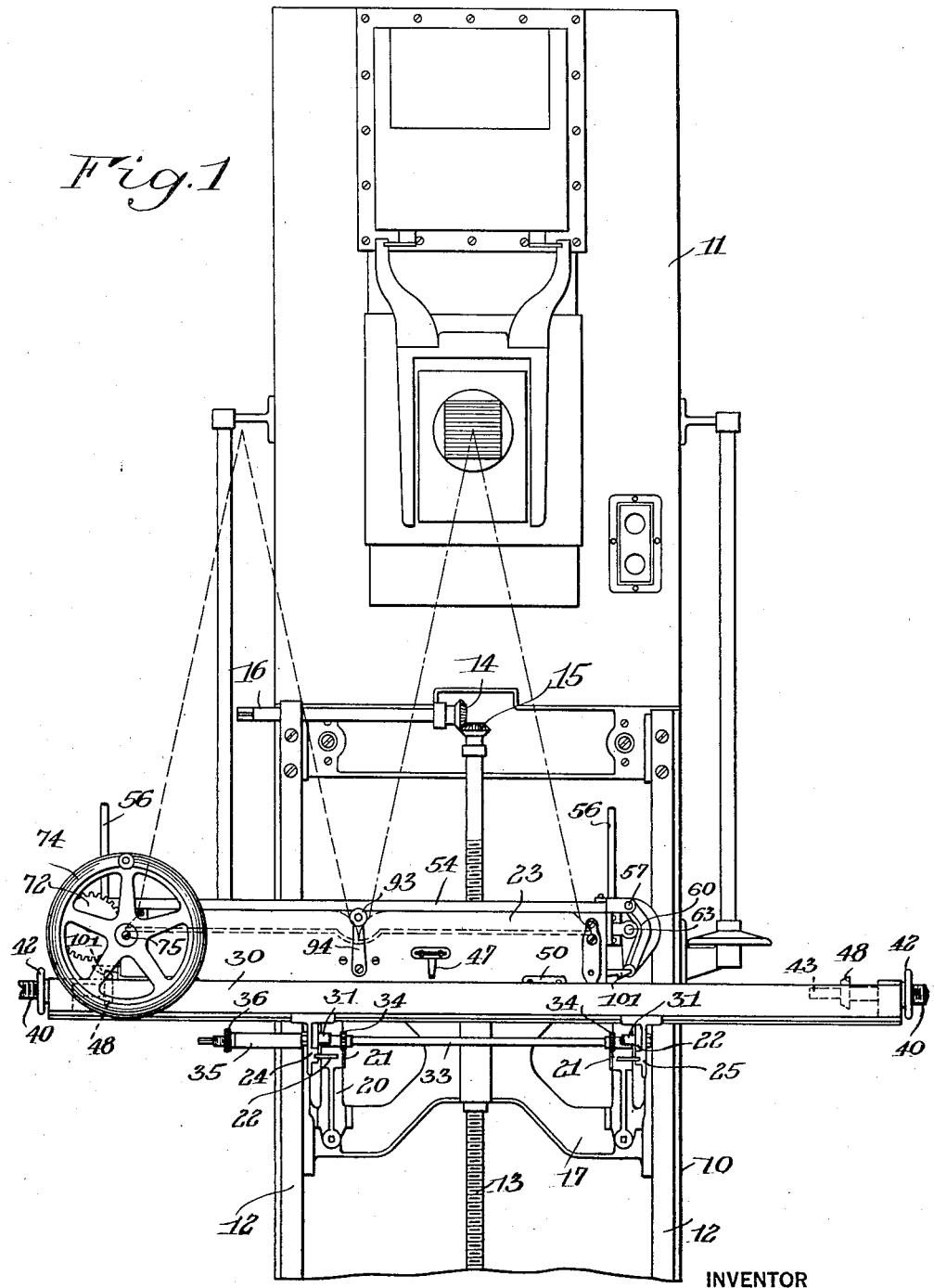

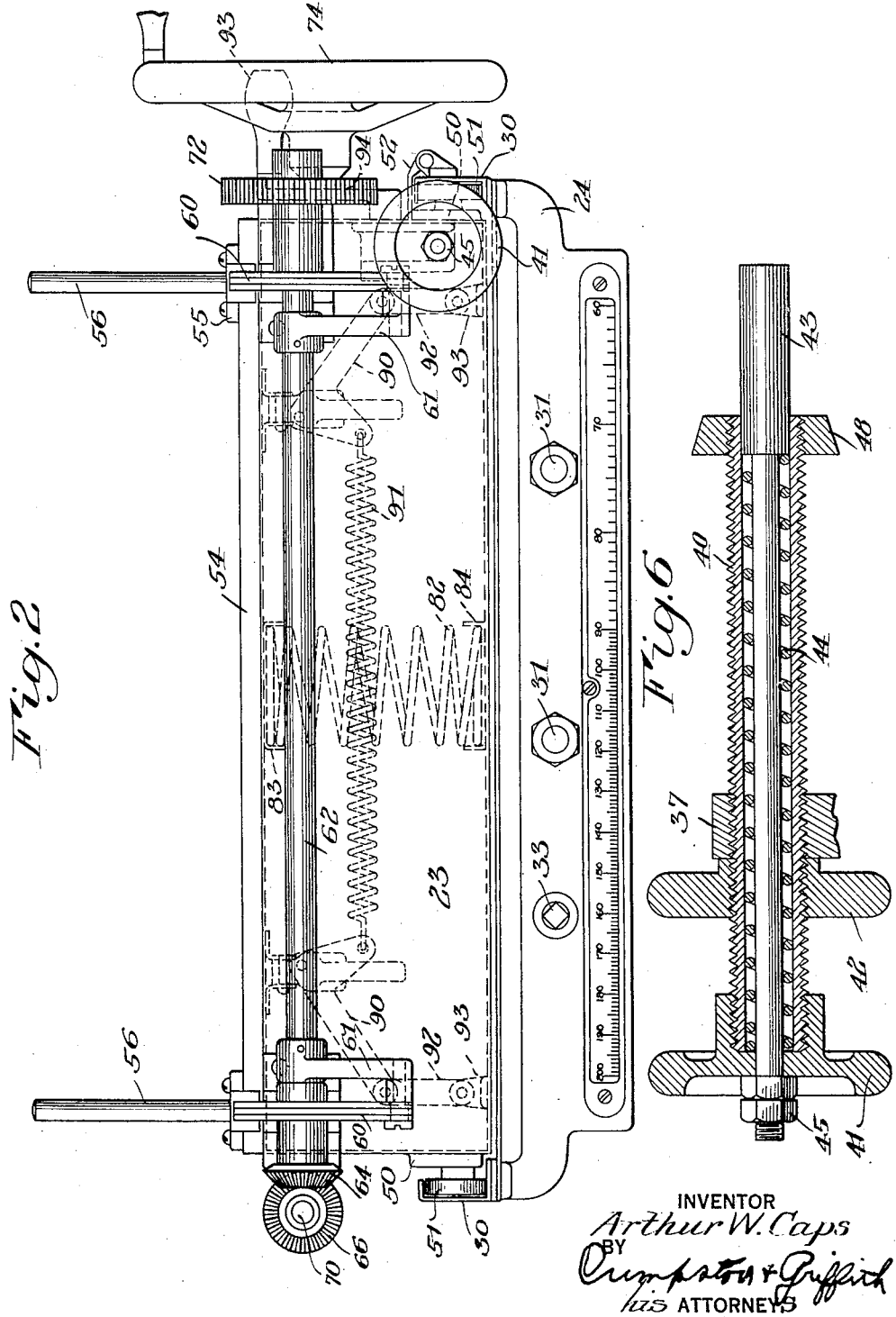

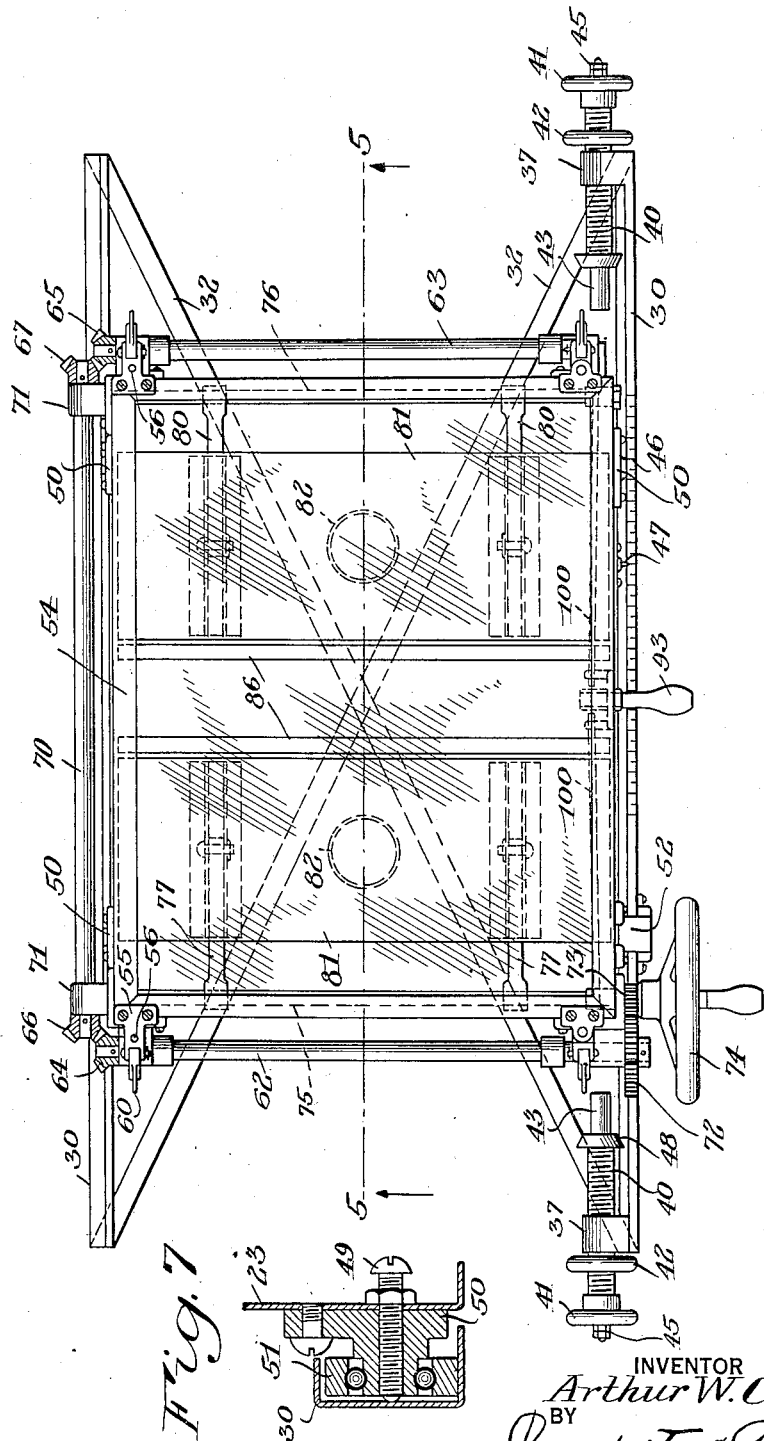

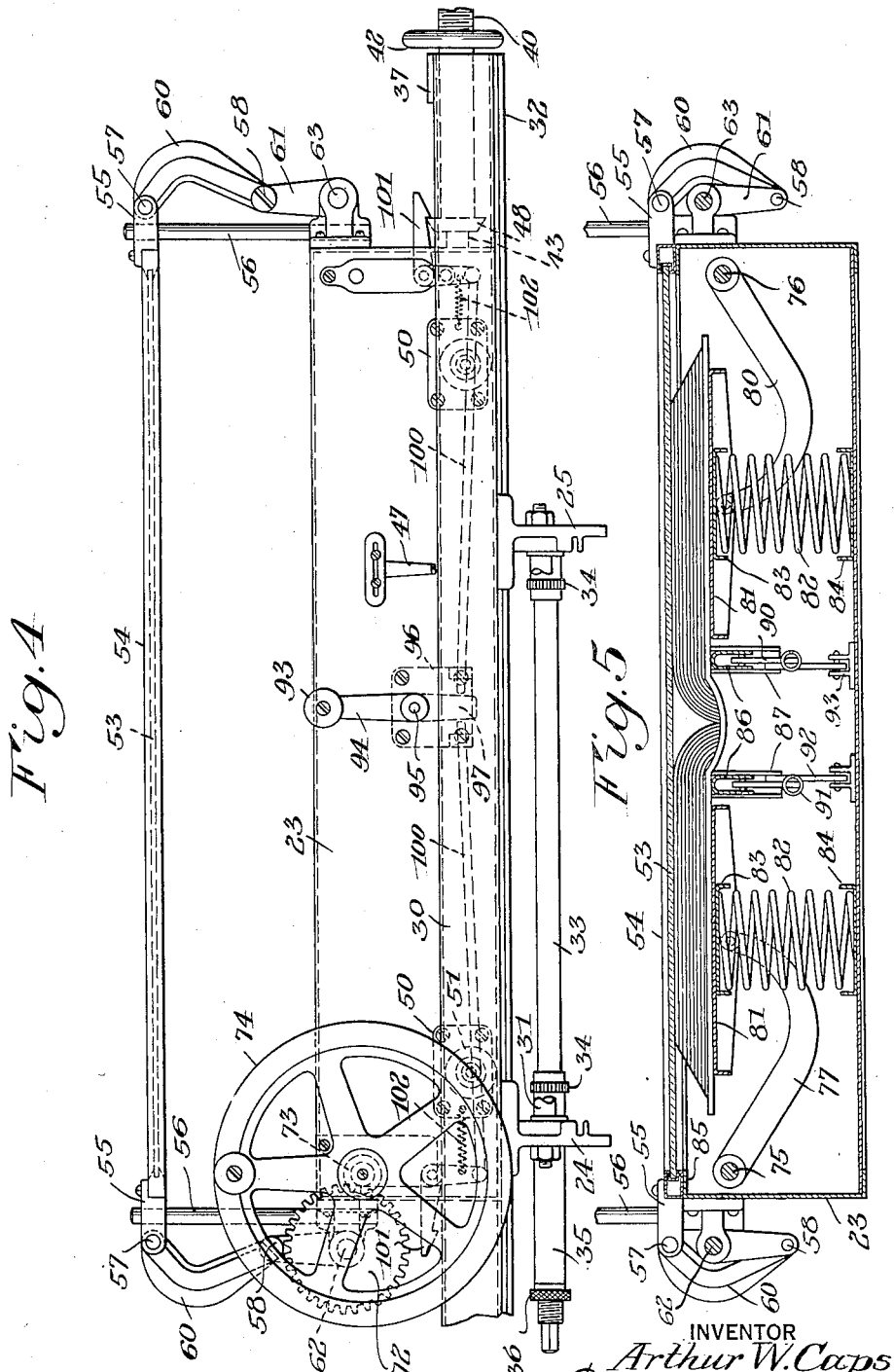

1,752,329

UNITED STATES PATENT OFFICE

ARTHUR W. CAPS, OF ROCHESTER, NEW YORK, ASSIGNOR TO PHOTOSTAT CORPORATION, OF PROVIDENCE, RHODE ISLAND, A CORPORATION OF RHODE ISLAND

COPYHOLDER

Original application filed January 20, 1927, Serial No. 162,257. Divided and this application filed February 20, 1928. Serial No. 257,290.

This invention relates to photographic apparatus and has for an object to provide improved copyholding means for a photographic copying machine and more particularly to provide an improved bookholder for a machine of the above type; which may be easily shifted from one copying position to another; which may be readily moved to the proper focusing position, and which may be readily shifted to center the manuscript to be copied.

To these and other ends the invention resides in certain improvements and combinations of parts, all as will be hereinafter more fully described, the novel features being pointed out in the claims at the end of the specification.

In the accompanying drawings in which is shown one of the various possible embodiments of this invention, Fig. 1 is a general front elevation of the bookholder applied to a photographic copying machine;

Fig. 2 is a side elevation of the bookholder shown on a larger scale;

Fig. 3 is a plan view of the bookholder and its supporting tracks;

Fig. 4 is a front elevation of the bookholder showing the means for retaining it at one end of its supporting tracks;

Fig. 5 is a sectional elevation taken substantially on line 5—5 of Fig. 3;

Fig. 6 is a sectional view of a portion of the buffer or cushioning means; and Fig. 7 is a view, partly in section, showing the means for spacing the bookholder from the side walls of the channel tracks, and for confining the bookholder to a definite path.
This application is a division of my copending application, Serial No. 162,257, filed January 20, 1927 for bookholders.

Similar reference numerals throughout the several views indicate the same parts.
Referring now to the drawings in detail, there is shown in Fig. 1 the supporting frame work 10 mounted on or positioned adjacent the photographic apparatus 11 and provided with a base (not shown) of any suitable type. The frame work 10 is provided, on the side adjacent the photographic apparatus with two upright or vertical guide members 12 and a vertical screw member 13 which latter member is suitably journalled on the base and provided with suitable actuating means such as the miter gears 14 and 15 and shaft 16 as shown. A supporting member 17 is mounted for vertical movement on the guides 12 and screw member 13 and provided with brackets 20 projecting forwardly therefrom and having their upper surfaces lying substantially in a horizontal plane. The brackets 20 are provided adjacent their inner horizontal side edges with racks 21 and adjacent their outer side edges with projecting guide members 22.

A carriage for the bookholder or box 23 comprising supporting members 24 and 25, having longitudinally extending grooves which receive the projecting guides 22, and channel track members 30 rigidly connected together, is mounted for forward and rearward movement on the members 20. Tie rods 31 extend between the members 24 and 25 and hold the said members in their proper relative positions. The channel track members are braced by cross-members 32. A shaft 33 is rotatably mounted on and extends between the members 24 and 25 and has a threaded end portion extending through and projecting beyond the member 24. Pinions 34 are rigidly mounted on the shaft 33 and positioned to mesh with the racks 21. A sleeve 35 having a tapered end portion is fitted on the threaded end portion of the shaft 33 with its tapered end extending into a tapered recess in the member 24. A lock nut 36 is threaded on to the shaft 33 against the sleeve member for forcing the tapered end of the sleeve into the tapered recess in the member 24 to lock the pinions 34 in position on the racks 21.

Each end of the forward channel track member is provided on its inner side with a lug or projecting portion 37 in which is threaded a tube or sleeve 40 (Fig. 6) having at one end an adjusting handle 41 and at the other end a locking collar 48 in the form of a truncated cone rigidly mounted thereon. A lock nut 42 is mounted on the member 40 intermediate the ends thereof and is adapted to hold the member 40 in its adjusted position. A plunger 43 is mounted within the tube 40 and is provided with a spring 44 which holds it in outward or projecting position. Lock nuts 45 are provided on the plunger 43 to limit its outward travel.

A scale, indicated at 46, having a zero central point and graduations reading up on either side of the center is applied to the forward channel track in any suitable manner for cooperation with an adjustable pointer 47 mounted on the bookholder.

The bookholder or box is mounted on the carriage for reversible sideward movement. The front and rear walls of the box have castings or projecting members 50 carrying ball bearing rollers 51 mounted thereon. The rollers 51 extend within the channel track members and ride on the lower side walls thereof, permitting the box to be freely moved from side to side. The members 50 may have threaded holes extending therethrough for the reception of screws 49 the outer ends of which bear against the inner vertical faces of the channel track members and prevent lateral movement of the box on the tracks.

A latch 52 is pivotally mounted on the forward channel track member in such a position that it may enter a notch or groove in one of the members 50 and hold the box locked in its centered position.

The box is provided with a cover member comprising a pane of glass 53 mounted in a metal frame 54 having lugs or projections 55 mounted thereon adjacent the corners. The members 55 are provided with vertically extending slots for the reception of guide pins 56 and horizontally extending slots for the reception of pivot pins 57 to each of which is attached an end of a substantially L-shaped link 60. The opposite ends of the links 60 are pivotally attached by means of pins 58 to arms or levers 61 which are rigidly mounted on shafts 62 and 63 extending along and mounted upon opposite sides of the box. Shafts 62 and 63 are provided at their ends adjacent the rear side of the box with miter gears 64 and 65, respectively, which mesh with miter gears 66 and 67 on shaft 70 which is rotatably mounted in lugs 71 on the rear wall of the box. An end of the shaft 62 projects beyond the front wall of the box and has a gear 72 rigidly mounted on the projecting end portion. The gear 72 is positioned to mesh with a gear 73 carried by hand wheel 74 which is rotatably mounted on a projecting end portion of a shaft 75.

Movement of the hand-wheel 74 is transmitted through the shafts and gears described to the levers 61 which operate through the links 60 to raise and lower the cover vertically on the guides 56. When the cover is in its raised or lowered position the relative positions of the axes of the pins 57 and 58 and the shaft 63 are such that the cover is effectively locked in position.

Shafts 75 and 76 are pivotally mounted on the front and rear walls within the box and have oppositely disposed levers or arms 77 and 80 rigidly mounted thereon and extending toward the center of the box. Plate members 81 extend between the front and rear walls within the box and are pivotally mounted on the inner free ends of arms 77 and 80. Helical springs 82 have their ends seated in cups 83 on the under surfaces of the members 81 and cups 84 on the bottom wall of the box, and normally hold the end portions of the members 81 yieldingly in contact with the under surface of a flange 85 extending inwardly from the walls of the box adjacent the top thereof.

Adjacent the center of the box and between the members 81, channel bars 86 are mounted equidistant from the center in vertical slots or channels 87 formed on the front and rear walls of the box. Each bar 87 has two oppositely disposed bell crank levers 90 pivotally attached thereto adjacent its ends. The short legs or arms of the bell crank levers on each bar are connected by a spring 91, and the long legs or arms are pivotally attached to links 92 which are in turn pivotally connected with brackets 93 mounted on the bottom wall of the box. The lengths of the long arms of the bell cranks 90 and the links 92 and the position of the flange 85 are such that the springs 91 tend to rock the bell cranks in such a manner as to push downwardly on the links 92 and thus force the bars 86 into yielding contact with flange 85 at the top of the box without danger of the pivotal axes between the long arms and the links moving past dead center and the bell cranks turning over. A positive, direct action of the springs 91 is thus assured.

In contrast with the action of the plates 81 the ends of which can only move upwardly or downwardly in susbtantially a single horizontal plane by reason of their connection with the rigidly mounted arms 80, either end of a bar 86 may be moved upwardly or downwardly without effecting the upward or downward movement of the opposite end.

The box cover and its cooperating mechanism, the plates 81, and the bars 86 are adapted to cooperate to hold a book in open position. The cover may be raised as previously described, by moving the handwheel 74; the book, in open position, is placed with its back between the bars 86 and the covers in contact with the plates or supports 81 and the bars 86, and the cover is moved downwardly into contact with the upper surface of the flange 85 by moving the handwheel in the reverse direction. This action forces the plates 81 and bars 86 downwardly against the action of the springs 82 and 91 and the major portions of the exposed pages of the book are thus pressed out flat against the under surface of the glass portion 53 of the cover and lie substantially in a single plane. The plates 81 are independent of each other and each one is depressed a distance equal to the thickness of the portion of the book carried thereby. The extent of the depression or downward movement of a bar 86 is also governed by the thickness of the portion of the book with which is is in contact. The springs 91 are designed to exert sufficient pressure to eliminate to some extent the curvatures of the pages adjacent the binding. The springs 91 therefore are preferably relatively stronger than the springs 82. The provision of strong springs at the center and weaker springs at the sides causes the sheets to be ironed outwardly from the center and insures the elimination of any buckling effect at the center, and the positioning of all the printed or written matter in substantially a single plane.

For the purpose of moving and locking the box, on the tracks there is provided a handle 93 attached to an end of a lever 94 which is positioned outside the box and rigidly attached to an end of a shaft 95 which is journaled in a casting 96 mounted on the inner surface of the front wall and projects into the box. A shorter lever 97 is rigidly mounted on the inwardly projecting end portion of the said shaft, preferably in alignment with the lever 94. Rods 100 are slidably mounted in bosses on the casting 96 on opposite sides of the lever 97 and have free end portions extending into the path of travel of the said lever for contact therewith. The opposite ends of the rods 100 are pivotally attached to downwardly extending arms of bell crank levers 101 which are also provided with arms extending substantially at right angles to the downwardly extending arms and through the side walls of the box substantially parallel to the front walls. The bell cranks are pivotally attached to the inner side of the front wall of the box, and the free ends of the outwardly projecting portions are formed into downwardly facing hooks or latches having downwardly and inwardly beveled outer faces. The lowermost portions of the hook members are normally positioned in the plane of the upper surface of the tubes 40 of the spring buffers, and springs 102 hold them yieldingly in their normal positions and tend to return them when they are moved upwardly therefrom.

Pressure on the handle 93 will cause the box to be moved on the tracks in the direction of motion of the handle. As the box approaches the end of its travel an outer wall thereof will strike the plunger 43 and compress the spring 44; the outwardly extending arm of the bell crank 101 on the end of the box adjacent the contacting plunger will ride up the inclined face of the collar 48 and the hook portion of the bell crank will be drawn into engagement with the said collar by a spring 102 and the box will be locked in position. When the box is to be moved to the opposite end of the track, the handle 93 is pushed in the opposite direction; the lever 97 is thereby moved into contact with the free end of the rod 100 which is connected to the bell crank in engagement with the collar 48, and the hook member is thus raised and the box released. The potential energy stored in the compressed spring is thus converted into kinetic energy which operates to overcome the inertia of the box at the commencement of its movement. A slight continued pressure on the handle 93 is sufficient to keep the box in motion until it comes into contact with the buffer at the opposite side when the compression of the other spring and the interlocking of the other hook and collar is effected as in the first instance.

The stopping points of the bookholder or box on either side of the center may be altered by manipulation of lock nut 42 and handle 41 for positioning the tube 40 in the lugs 37. The adjusting means provided permits the proper centering of the book regardless of the position to which it is opened. The box or holder may be so adjusted as to center the printed or written matter on each exposed page under the lens or prism.

The box or holder may be used for centering single pages for copying. In this case a plate (not shown) is provided with guides which fit between the bars 86. The plate, which may be cardboard or similar material is placed upon the plates 81 and bars 86 and centered by means of the guides referred to; the page to be copied is then centered on the said plate and the box cover is moved to its closed position on the box. The box may then be centered by means of the latch 52 and the notch in the member 50 referred to above, and the exposure made.

From the foregoing it will be seen that there is herein provided an apparatus which embodies the features of this invention and achieves the objects thereof. Improved book and copy holding apparatus is provided which is thoroughly dependable and efficient in operation and by means of which books or manuscripts to be copied can be quickly and easily placed in proper copying positions and securely held in such positions. The buffers serve both as means to absorb the shocks of the bookholder in its movement into proper position and also as means for effectively assisting in the starting movement of the bookholder from one position to another, so that the operator needs to exert very little more energy for this purpose than that required to release the latch by the handle 93.

As many possible embodiments may be made of the above invention, and as many changes might be made in the embodiment above set forth, it is to be understood that all matter hereinbefore set forth or shown in the accompanying drawings is to be interpreted as illustrative and not in a limiting sense.

I claim as my invention:

1. In a photographic apparatus, the combination with a copyholder having a latch member projecting from an end thereof and adapted for reversible movement, of a buffer member adapted to contact with said copyholder to limit the movement of said copyholder and a collar mounted on said buffer member and adapted to cooperate with the latch member carried by said copyholder for locking said copyholder in contact with said buffer.

2. In a photographic apparatus, the combination with a copyholder having a latch member projecting from an end thereof and adapted for reversible movement, of a buffer member adapted to contact with said copyholder to limit the movement of said copyholder and a collar mounted on said buffer member and adapted to cooperate with the latch member carried by said copyholder for locking said copyholder in contact with said buffer, said buffer being adjustably mounted in a threaded opening and said locking collar being rigidly mounted on said buffer.

3. In a photographic apparatus, oppositely disposed track means having upwardly extending outer walls, a copyholder mounted for reversible movement on said track means, and adjustable means mounted on said copyholder for contact with the outer walls of said track means to prevent lateral movement of said copyholder on said track means.

4. In a photographic copying apparatus, the combination with a camera embodying a lens system, of a copyholder arranged in the objective plane of the lens system embodying a support having guides, an object holder reciprocatable on the guides in a direction transversely of the axis of the light cone reflected by the lens system, and resilient buffers on the support arranged to retard the movements of the object holder and to impel it initially in the opposite direction upon its reversal.

5. In a photographic copying apparatus, the combination with a camera embodying a lens system, of a copyholder arranged in the objective plane of the lens system embodying a support having guides, an object holder reciprocatable on the guides in a direction transversely of the axis of the light cone reflected by the lens system, and a buffer unit on the support at each end of the path of movement of the object holder arranged to retard the movements of the object holder and then definitely arrest it.

6. In a photographic copying apparatus, the combination with a camera embodying a lens system, of a copyholder arranged in the objective plane of the lens system embodying a support having guides, an object holder reciprocatable on the guides in a direction transversely of the axis of the light cone reflected by the lens system, resilient buffers on the support arranged to retard the movements of the object holder at the ends of its strokes, and to impel it initially in the opposite direction upon its reversal, and latches arranged to hold the object holder fixed against the said impelling force of the buffers.

7. In a photographic copying apparatus, the combination with a camera embodying a lens system, of a copyholder arranged in the objective plane of the lens system embodying a support having guides, an object holder reciprocatable on the guides in a direction transversely of the axis of the light cone reflected by the lens system, resilient buffers on the support arranged to retard the movements of the object holder at the ends of its strokes, and to impel it initially in the opposite direction upon its reversal, automatic latches arranged to hold the object holder fixed against the said impelling force of the buffers, and a common releasing means for the latches mounted on the object holder.

8. In a photographic copying apparatus, the combination with a camera embodying a lens system, of a copyholder arranged in the objective plane of the lens system embodying a support having guides, an object holder reciprocatable on the guides in a direction transversely of the axis of the light cone reflected by the lens system, resilient buffers on the support arranged to retard the movements of the object holder at the ends of its strokes, and to impel it initially in the opposite direction upon its reversal, automatic latches arranged to hold the object holder fixed against the said impelling force of the buffers, a handle on the object holder for manipulating it on the guides and connections between the handle and the latches for releasing the latter.

9. In a photographic copying apparatus, the combination with a camera embodying a lens system, of a copyholder arranged in the objective plane of the lens system embodying a support having guides, an object holder reciprocatable on the guides in a direction transversely of the axis of the light cone reflected by the lens system, resilient buffers on the support arranged to retard the movements of the object holder at the ends of its strokes and to impel it initially in the opposite direction upon its reversal, automatic latches arranged to hold the object holder fixed against the said impelling force of the buffers, a crank handle on the object holder also having limited movement relatively thereto, and connections between the crank handle and the latches for releasing one of them when the crank handle is operated toward the other.

10. In a photographic copying apparatus, the combination with a camera embodying a lens system, of a copyholder arranged in the objective plane of the lens system embodying a support having guides, an object holder reciprocatable on the guides in a direction transversely of the axis of the light cone reflected by the lens system, means for halting and positioning the object holder in either of two extreme positions in which either of two objects arranged side by side thereon are centered with relation to the axis of the lens system, and separate means for so centering the object holder in an intermediate position.

11. In a photographic copying apparatus, the combination with a camera embodying a lens system, of a copyholder arranged in the objective plane of the lens system embodying a support having guides, an object holder reciprocatable on the guides in a direction transversely of the axis of the light cone reflected by the lens system, stops for arresting the object holder at opposite ends of the guides and latches cooperating with the stops to hold the object holder there.

12. In a photographic copying apparatus, the combination with a camera embodying a lens system, of a copyholder arranged in the objective plane of the lens system embodying a support having guides, an object holder reciprocatable on the guides in a direction transversely of the axis of the light cone reflected by the lens system, stops for arresting the object holder at opposite ends of the guides and latches cooperating with the stops to hold the object holder there, the latter being provided with an operating handle connected with both latches to release the same.

13. In a photographic copying apparatus, the combination with a camera embodying a lens system, of a copyholder arranged in the objective plane of the lens system embodying a support having guides, an object holder reciprocatable on the guides in a direction transversely of the axis of the light cone reflected by the lens system, stops for arresting the object holder at opposite ends of the guides and latches cooperating with the stops to hold the object holder there, said stops comprising collars mounted on threaded elements adjustable in the support and provided with locking devices.

14. In a photographic copying apparatus, the combination with a a camera embodying a lens system, of a copyholder arranged in the objective plane of the lens system embodying a support having guides, an object holder reciprocatable on the guides in a direction transversely of the axis of the light cone reflected by the lens system, stops for arresting the object holder at opposite ends of the guides and latches cooperating with the stops to hold the object holder there, said stops comprising collars mounted on threaded tubes adjustable in the support and containing spring buffers projecting beyond the stops to retard the impact of the object holder.

15. In a photographic copying apparatus, the combination with a camera embodying a lens system, of a copyholder arranged in the objective plane of the lens system, embodying a support having guides and a supplemental support also provided with guides and movable in a direction transverse to the latter on the first mentioned guides of the support, an object holder having an operating handle whereby it is reciprocated on the guides of the supplemental support in a direction transversely of the axis of the light cone reflected by the lens system, stops for arresting the object holder, means for adjusting the supplemental support on the main support, and a locking device for said adjusting means to hold its adjustment against the jar of the impacts of the object holder with its stops.

ARTHUR W. CAPS.